(12) United States Patent
Jackson

(10) Patent No.: US 9,921,001 B2
(45) Date of Patent: Mar. 20, 2018

(54) HEAT RECOVERY STEAM GENERATOR AND MULTIDRUM EVAPORATOR

(75) Inventor: Bradley N. Jackson, Kirkwood, MO (US)

(73) Assignee: Nooter/Eriksen, Inc., Fenton, MO (US)

(*) Notice: Subject to any disclaimer, the term of this patent is extended or adjusted under 35 U.S.C. 154(b) by 365 days.

(21) Appl. No.: 14/113,875

(22) PCT Filed: Apr. 10, 2012

(86) PCT No.: PCT/US2012/032828
§ 371 (c)(1),
(2), (4) Date: Oct. 25, 2013

(87) PCT Pub. No.: WO2012/148656
PCT Pub. Date: Nov. 1, 2012

(65) Prior Publication Data
US 2014/0041839 A1 Feb. 13, 2014

Related U.S. Application Data

(60) Provisional application No. 61/478,695, filed on Apr. 25, 2011.

(51) Int. Cl.
*F28D 15/00* (2006.01)
*F22B 21/18* (2006.01)

(52) U.S. Cl.
CPC ............. *F28D 15/00* (2013.01); *F22B 21/18* (2013.01)

(58) Field of Classification Search
CPC .. F28D 15/00; F22B 1/18; F22B 21/04; F22B 21/18
(Continued)

(56) References Cited

U.S. PATENT DOCUMENTS 1,348,179 A * 8/1920 Kidwell ................. F22B 21/18
122/297
1,887,182 A 11/1932 Coutant
(Continued)

FOREIGN PATENT DOCUMENTS

CN 201066114 Y 5/2008
CN 201803358 U 4/2011
(Continued)

OTHER PUBLICATIONS

Chinese Office action for corresponding Application No. 2012 8003 4987 dated Jan. 19, 2015.
(Continued)

*Primary Examiner* — Raheena R Malik
(74) *Attorney, Agent, or Firm* — Polster Lieder Woodruff & Lucchesi, L.C.

(57) ABSTRACT

An evaporator for a heat recovery steam generator has two horizontal steam drums of moderate size, one located slightly higher than the other. It also includes a coil having tubes located in the flow of a hot gas. The lower drum communicates with the inlets of the tubes for the coil. The outlets of the tubes communicate with the upper drum. A drain line connects the bottom of the upper drum with the lower region of the lower drum, so that water will flow from the upper drum to the lower drum. Water, which is primarily in the liquid phase, enters the lower drum through an inlet line and mixes with water from the upper drum. The mixture flows through into the coil. Here some of it transforms into saturated steam while the rest remains as saturated water. The saturated steam and saturated water flow into the upper drum where the steam escapes and the water flows back into the lower drum to recirculate through the coil. Owing to their moderate sizes, the drums can withstand high pressures without having excessive wall thickness, and this enables the evaporator to be set into operation with minimal or no
(Continued)

hold points. Yet the two drums provide a retention time—and the protection that it provides—of a single large capacity drum having substantial wall thickness.

21 Claims, 2 Drawing Sheets

(58) Field of Classification Search
USPC .................. 165/104.21; 122/7 A, 7 R, 4 D
See application file for complete search history.

(56) References Cited

U.S. PATENT DOCUMENTS

| | | | | |
|---|---|---|---|---|
| 2,114,223 | A * | 4/1938 | Jacobus | F22B 37/265 122/302 |
| 2,414,848 | A * | 1/1947 | Badenhausen | F22B 21/18 122/365 |
| 3,590,785 | A * | 7/1971 | Csathy | F22B 21/18 122/42 |
| 4,188,916 | A * | 2/1980 | Csathy | F22B 21/10 122/7 R |
| 4,355,602 | A | 10/1982 | Cooke | |
| 4,572,110 | A * | 2/1986 | Haeflich | F01K 23/108 122/1 R |
| 5,201,282 | A * | 4/1993 | Albrecht | F22B 21/345 122/235.23 |
| 5,660,799 | A * | 8/1997 | Motai | B01D 53/343 122/470 |
| 5,924,389 | A * | 7/1999 | Palkes | F22B 1/1815 122/1 B |
| 6,050,226 | A * | 4/2000 | Shimada | F22B 1/1815 122/4 D |
| 6,092,490 | A * | 7/2000 | Bairley | F22B 1/1815 122/235.23 |
| 6,340,002 | B1 | 1/2002 | Liebig | |
| 6,557,500 | B1 * | 5/2003 | Schroeder | F22B 1/1815 122/406.1 |
| 7,168,233 | B1 | 1/2007 | Smith et al. | |
| 7,243,618 | B2 | 7/2007 | Gurevich | |
| 7,367,192 | B2 | 5/2008 | Hattori et al. | |
| 7,509,794 | B2 | 3/2009 | Bruckner et al. | |
| 7,770,544 | B2 * | 8/2010 | Viskup, Jr. | F22B 1/1815 122/235.19 |
| 2012/0240871 | A1 | 9/2012 | Bairley et al. | |

FOREIGN PATENT DOCUMENTS

| | | | |
|---|---|---|---|
| DE | 426488 C | 3/1926 | |
| GB | 241961 A | 10/1925 | |
| GB | 526825 A | 9/1940 | |
| GB | 529444 A * | 11/1940 | F22B 21/18 |
| JP | 36-012601 A | 0/1961 | |
| JP | 61-143601 Y | 1/1986 | |
| RU | 2070970 C1 | 12/1996 | |
| WO | WO 2012/129195 A2 | 9/2012 | |

OTHER PUBLICATIONS

International Search Report for PCT/US2012/032828 dated Jul. 30, 2012.
Written Opinion of the International Searching Authority for PCT/US2012/032828 dated Jul. 30, 2012.
Japanese Office Action for corresponding Application No. 2014/508375 dated Mar. 8, 2016 (English translation), and partial English Translations of JP Patents referred to in Official Action.
Russian Office Action for corresponding Application No. 2013152169 dated May 12, 2016, (English translation).

* cited by examiner

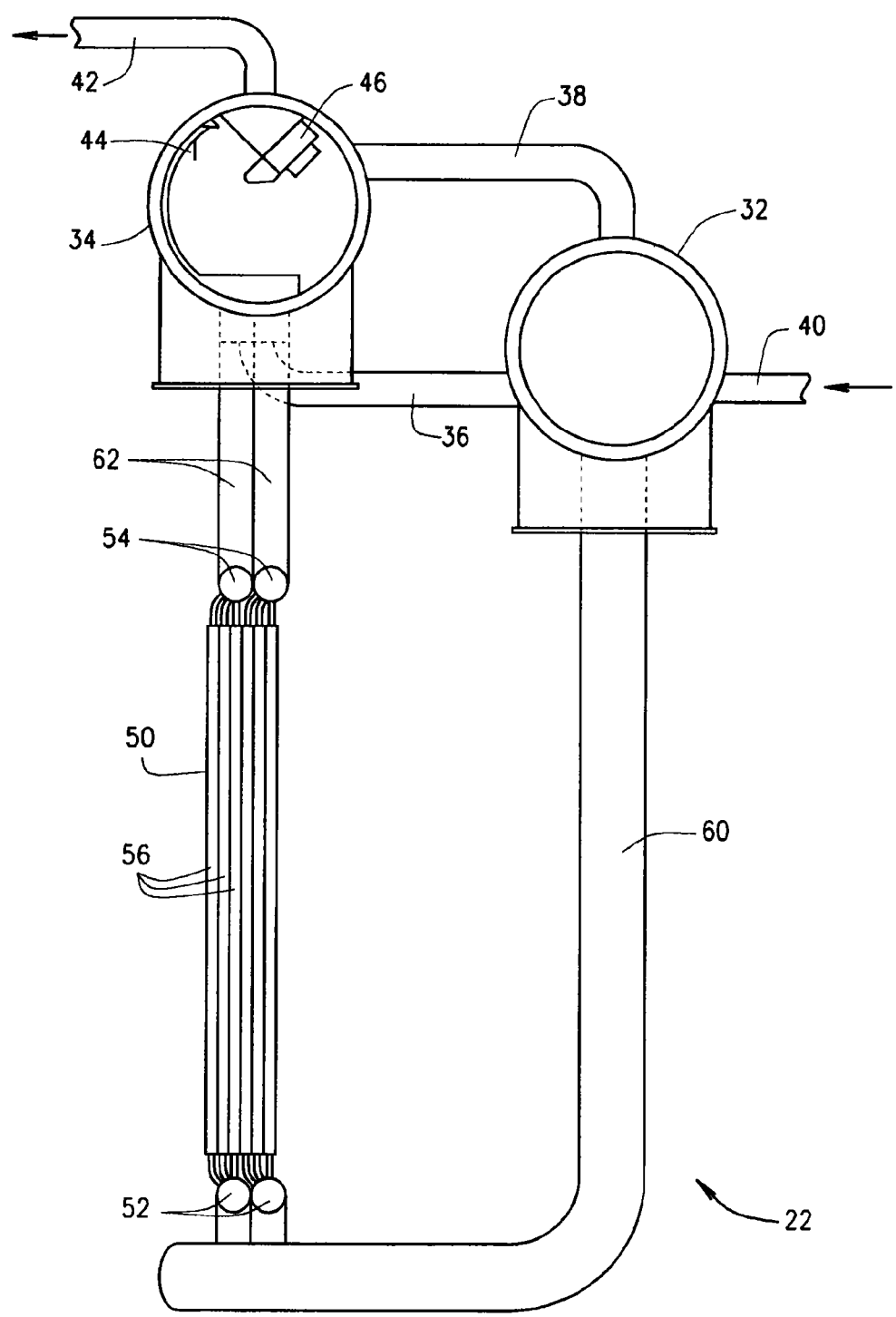
F I G. 2

HEAT RECOVERY STEAM GENERATOR AND MULTIDRUM EVAPORATOR

RELATED APPLICATION

This application is related to and derives priority from and otherwise claims the benefit of U.S. provisional patent application 61/478,695 filed 25 Apr. 2011, and International Application No. PCT/US2012/032828 filed 10 Apr. 2012, and published under International Publication No. WO 2012/148656 for "Multidrum Evaporator" both of which are incorporated herein by reference.

TECHNICAL FIELD

This invention relates in general to the transformation of liquid water into saturated steam and more particularly to an evaporator for producing saturated steam and to a process utilized by the evaporator.

BACKGROUND ART

The gas turbines that power electrical generators discharge exhaust gases at extremely high temperatures. Heat recovery steam generators (HRSGs) extract the heat from the gases to produce steam that powers steam turbines that in turn drive more electrical generators.

The typical HRSG includes multiple heat exchangers located one after the other in the flow of a hot exhaust gas from a gas turbine. Among heat exchangers are an economizer for elevating the temperature of feed water, an evaporator for converting the higher temperature feedwater discharged by the economizer into saturated steam, and a superheater for converting the saturated steam into superheated steam. Many HRSGs have more than one economizer, evaporator, and superheater operating at different pressures.

Some HRSGs utilize circulation-type evaporators. The typical circulation-type evaporator, which relies on density differences to circulate water through it, includes an overhead steam drum and a coil composed of tubes located in the flow of the hot gas, with the lower ends of the tubes being connected to the drum through a downcomer and the upper ends being in communication with the drum through risers. Heated water delivered by a pump through an economizer flows into the steam drum where it mixes with steam and water already in the drum. The water from the drum flows downwardly through the downcomer into lower ends of the tubes. The water thereupon rises upwardly in the tubes and absorbs enough heat from the gas flowing through the coil to become saturated. A portion of the saturated water converts to saturated steam. Both the saturated water and saturated steam flow upwardly into the steam drum. The saturated steam separates from the water in the steam drum and flows on to a superheater. Where a circulation-type evaporator has the tubes of its coil oriented horizontally, a pump may be needed to circulate the water through the coil.

Some HRSGs have large natural circulation-type evaporators of high capacity that operate at high pressures. These evaporators have large steam drums to accommodate the high capacity and thick walls to withstand the pressure. Indeed, a steam drum for a large capacity, high pressure, evaporator may have an external diameter of 80 inches and walls that are six or seven inches thick. The large capacity of the steam drum translates into a large volume and provides the drum with retention time, that is to say, it enables the drum to supply water to the coil in the absence of the delivery of water to the drum. This protects the coil from damage should the supply of water to the evaporator fail.

In order to avoid overstressing components of the HRSG, particularly the steam drums of its evaporators, the HRSG must undergo an extended start-up during which the heat-up rate is controlled, often by introducing hold points into the start-up procedure. The extended start-up delays operating the HRSG at peak efficiency. Moreover, the delay lengthens the time required to bring the HRSG—and any gas turbine with which it may be coupled—into compliance with emissions requirements.

BRIEF DESCRIPTION OF THE DRAWINGS

FIG. 2 is a schematic elevation view of the evaporator of the present invention.

BEST MODES FOR CARRYING OUT THE INVENTION

Figure 1:
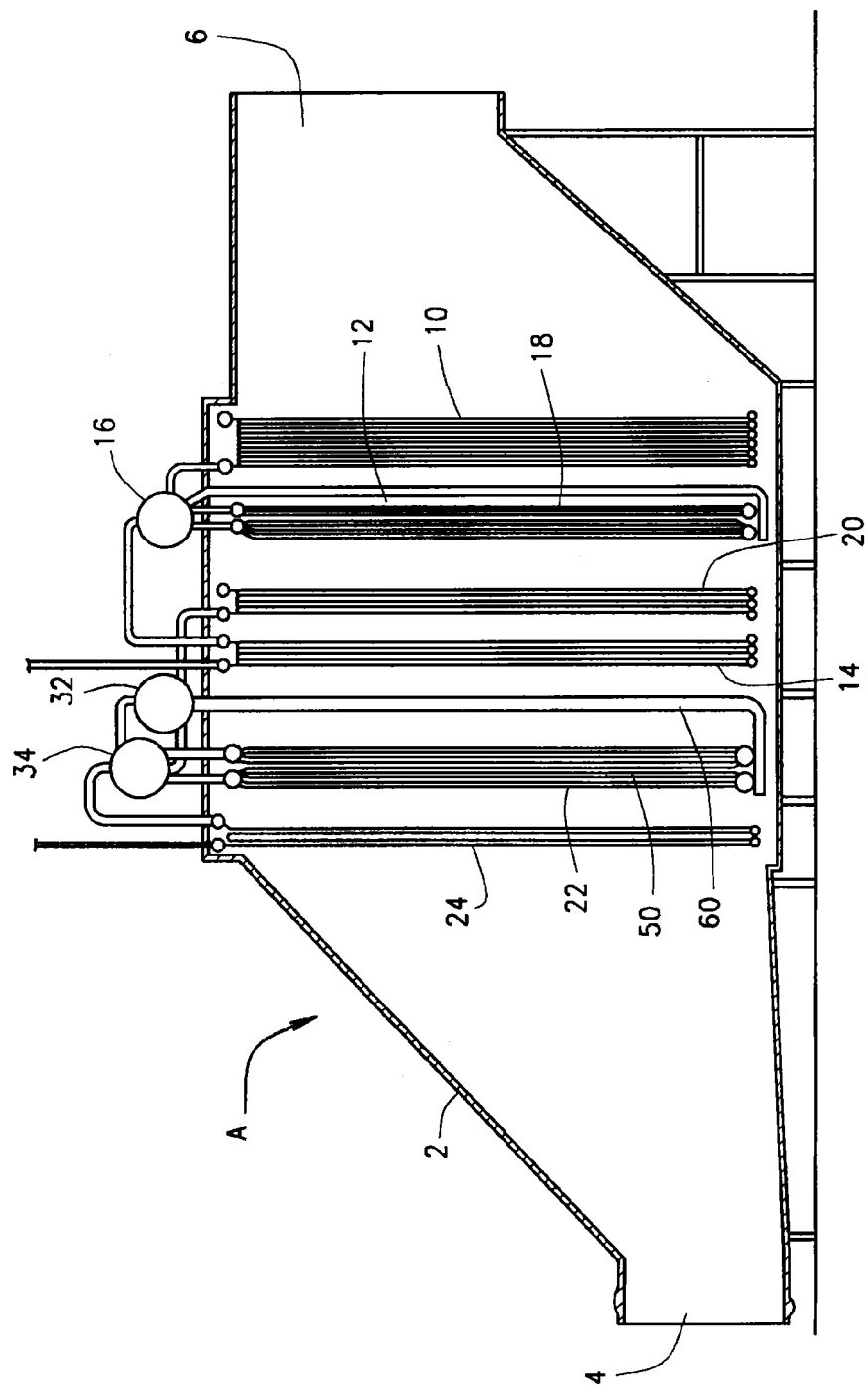
FIG. 1 is a schematic sectional view of an HRSG equipped with a conventional natural circulation-type evaporator and also with a natural circulation-type evaporator constructed in accordance with and embodying the present invention.

Referring now to the drawings, (FIG. 1), a heat recovery steam generator (HRSG) A has components, which are basically heat exchangers, organized in succession within a duct-like housing 2 for supplying superheated steam at low and high pressures. The housing 2 has an inlet 4 and an outlet 6. Hot gas, which may be the exhaust from a gas turbine, enters the housing 2 at the inlet 4 and within the housing 2 flows through the several components which extract heat from the gas and convert liquid feedwater into low and high pressure superheated steam.

Among the low pressure components of HRSG A are an economizer 10 for elevating the temperature of the feedwater, an evaporator 12 for converting the water from the economizer 10 into saturated steam, and a superheater 14 for converting the saturated steam from the evaporator 12 into superheated steam. The economizer 10, evaporator 12 and superheater 14 typically operate at a low pressure. The evaporator 12 may take the form of a conventional natural circulation-type evaporator, and as such, it will have a single steam drum 16 of cylindrical configuration located above a coil 18 through which the hot gas flows. The gas may be the exhaust from a gas turbine that powers an electrical generator.

In addition to its low pressure components, the HRSG has similar high pressure components—namely an economizer 20 for heating feedwater that is initially in the liquid phase, a high pressure evaporator 22 that receives the heated water from the economizer 20 and converts it into saturated steam, and a high pressure superheater 24 that converts the saturated steam from the evaporator 22 into high pressure superheated steam. Preferably, with reference to the flow of hot gas through the housing 2, the superheater 24 lies upstream from the evaporator 22, and the evaporator 22 lies upstream from the economizer 20. The evaporator 22 has the capacity to withstand high pressures reaching 2800 psig., yet can be brought up to its operating temperature without excessive hold points. Indeed, it may be set into operation without hold points.

Actually, an evaporator constructed as the evaporator 22 may be substituted for the evaporator 12. The HRSG A may have more than two sets of economizers, evaporators, and superheaters, or it may have a single set.

The evaporator 22 includes (FIG. 2) two steam drums of cylindrical configuration, located at a slightly different elevations—namely, a lower storage drum 32 and an upper separation drum 34 that may also function as a storage drum. The longitudinal axes of both drums 32 and 34 extend horizontally, and are preferably parallel. Both are smaller than a traditional single steam drum for an evaporator designed for similar capacity and pressure and retention time as well. Moreover, they have walls that are thinner than those of a single steam drum. The two drums 32 and 34 are connected through a drain line 36 that extends between the bottom of the upper drum 34 and the lower region of the lower drum 32, that is to say, below the midpoint of the side of the drum 32. They are also connected through a vent line 38 that extends between the top of the lower drum 32 and the upper region side of the upper drum 34—indeed near the top of the drum 34. The lower drum 32 connects with an inlet line 40 that opens into its lower region. Water, which is primarily in the liquid phase, is directed into the inlet line 40 and thence into the drum 32 by a pump that is connected to the economizer 20, with the supply being controlled by a conventional three-element control system. However, the inlet line 40 may instead connect with the lower region of the upper drum 34. The upper drum 34 has an outlet line 42 connected to it at its very top, and the outlet line 42 leads to the superheater 24 located upstream in the flow of hot gas from the evaporator 22. Within its interior the upper drum 34 contains primary and secondary steam-water separation devices 44 and 46, respectively. The two drums 32 and 34 may be located either within or above the housing 2.

In addition, the high pressure evaporator 22 has a coil 50 that lies within the interior of the housing 2, so that the hot gas will flow through it. The coil 50 includes lower headers 52 and upper headers 54 as well as multiple tubes 56 that extend vertically between the headers 52 and 54 in several rows. The lower headers 52 are connected to the bottom of the lower drum 32 through a downcomer 60. The upper headers 54 communicate with the upper drum 34 through risers 62 that open into the bottom of the upper drum 34.

In the operation of the evaporator 22, water, which is primarily in the liquid phase, is delivered at high pressure from the economizer 20 to the lower drum 32 at the inlet line 40 or it may flow into the upper drum 34 if the inlet line 40 is connected to it. If the latter, the water will find its way into the lower drum 32 through the drain line 36. Actually, the water that arrives through the inlet line 40 mixes with saturated water that enters the upper drum 34 through the risers 62 and then flows from the upper drum 34 through the drain line 36 into the lower drum 32. The water in the lower drum 32 discharges into the downcomer 60 and flows downwardly through the downcomer 60 into the lower headers 52. From there it enters the tubes 56 of the coil 50 at the lower ends of the tubes 56, which serve as inlets for the tubes 56. The hot gas flowing over the tubes 56 heats the water in the tubes 56 to the boiling temperature at the pressure at which the coil 50 operates, and some of that water transforms into saturated steam. The rest of the water in the upper elevations of the tubes 56 remains as saturated water and keeps the interior surfaces of the tubes 56 wet so that the coil 50 does not overheat. The mixture of saturated steam and saturated water leaves the tubes 50 at their upper ends, which are outlets, and flows upwardly through the risers 62 and into the upper steam drum 34. There the steam separates from the water and leaves through the outlet line 42 which directs it to the superheater 24 located upstream in the flow of the gas from the evaporator 22. The saturated water flows through the drain line 36 to the lower drum 32 to be recirculated through the downcomer 60, the coil 50, and the risers 62. Some saturated steam may accompany the saturated water that flows through the drain line 36 into the lower drum 32, but it passes back into the upper drum 34 through the vent line 38. The natural circulation of water through the evaporator 22, including its coil 50, may rely entirely on natural convention.

The two drums 32 and 34 together have the same capacity as a single drum on an evaporator of equivalent retention time operating at the same pressure, yet each is considerably smaller in diameter and as such can withstand the high pressure with a substantially thinner wall, which each has. Whereas the wall of a single drum for a high capacity, high pressure evaporator may be 6 or 7 inches thick, the walls of the drums 32 and 34 for the evaporator 22 operating at an equivalent pressure and capacity, need only to be 4 or 5 inches thick or even less. While affording the retention time of a single drum, the two drums 32 and 34 require less time to heat up and reach the operating temperature for the evaporator 22. This in turn shortens the start-up cycle for the HRSG A.

Instead of a single lower drum 32, the evaporator 22 may have two or more lower drums 32. Also, the tubes 56 of the coil 50 may open directly into the upper steam drum 34, thus eliminating the upper headers 54 and risers 62. Moreover, while the drums 32 and 34 are cylindrical, one or both, while being elongated, may have other cross-sectional configurations. The natural convection in the evaporator 22 may be supplemented with a pump.

Actually, the evaporator 22 need not rely on natural convection at all to circulate water through it, but may instead rely on forced circulation provided by a pump. The evaporator 22 as so modified may have the tubes 56 of its coil 50 extended horizontally in the flow of hot gas through the housing 2, with the inlets of the tubes 56 opening into a header that connects with the lower drum 32 and serves as the downcomer 60 and the outlets of the tubes 56 opening into another header that leads to the upper drum 34 and serves as the riser 62.

The invention claimed is:

1. A heat recovery steam generator comprising:
   a housing having an inlet into which a hot gas is directed and an outlet through which the gas can be discharged, configured to form an internal exhaust gas flow path within the housing so that the gas can flow through the housing from its inlet to its outlet;
   an economizer located in the housing configured such that the gas can flow through it, the economizer having a configuration for receiving liquid feedwater and for elevating the temperature of the feedwater;
   an evaporator configured for converting liquid water, into saturated steam, said evaporator comprising: an upper drum positioned to be external to the housing's internal exhaust gas flow path and oriented horizontally, the upper drum having at least one steam-water separation device; at least one lower drum positioned to be external to the housing's internal exhaust gas flow path and oriented horizontally and located at an elevation less than the upper drum; a drain line connecting the lower region of the upper drum to the lower drum; an inlet line opening into one of the drums; an outlet line leading out of the upper region of the upper drum; a coil having tubes located in a flow of a hot gas and provided with inlets and outlets, with the inlets of the tubes being in communication with the lower drum and the outlets of the tubes being in communication with the upper drum; the evaporator having its coil located in the housing upstream, in the flow of gas, from the economizer, with the inlet line of the evaporator being connected to the economizer to be capable of receiving from the economizer water that has undergone heating in the economizer; and a superheater located in the housing upstream from the evaporator, with the outlet line of the evaporator being connected to the superheater.

2. A heat recovery steam generator according to claim 1 wherein the tubes of the evaporator coil are in fluid flow communication with the lower drum at the bottom of the lower drum.

3. A heat recovery steam generator according to claim 2 wherein the tubes of the evaporator coil are in fluid flow communication with the upper drum at the bottom of the upper drum.

4. A heat recovery steam generator according to claim 3 wherein the evaporator tubes extend vertically and have their inlets at their lower ends connected to a distribution header, which distribution header is positioned within the internal exhaust gas flow path, and further comprising a downcomer in fluid flow connection with the lower drum and with the said distribution header.

5. A heat recovery steam generator according to claim 4 wherein the outlets of the evaporator tubes are at the upper ends of the tubes and further comprising at least one riser connecting the outlets of the tubes with the upper drum.

6. A heat recovery steam generator according to claim 3 wherein the evaporator inlet line opens into the lower drum.

7. A heat recovery steam generator according to claim 3 wherein the evaporator drain line opens into the lower region of the lower drum.

8. A heat recovery steam generator according to claim 1 wherein at least one of the evaporator drums is cylindrical.

9. A heat recovery steam generator according to claim 1 wherein the upper and lower evaporator drums are cylindrical.

10. The heat recovery steam generator of claim 1, further comprising the lower drum having a steam outlet, and the upper drum having a steam inlet, and a steam vent conduit in fluid flow connection with the lower drum steam outlet and the upper drum steam inlet.

11. The heat recovery steam generator of claim 1, further comprising the lower drum steam outlet being located at the top of the lower drum, and the upper drum steam inlet being located the upper region side of the upper drum.

12. The heat recovery steam generator of claim 1, further comprising the upper drum and lower drum each having walls, the said walls being four inches to about five inches thick.

13. The heat recovery steam generator of claim 1 wherein:
the tubes of the evaporator coil are in fluid flow communication with the lower drum at the bottom of the lower drum;
the tubes of the evaporator coil are in fluid flow communication with the upper drum at the bottom of the upper drum;
the evaporator tubes extend vertically and have their inlets at their lower ends in fluid flow connection with a distribution header, and further comprising a downcomer in fluid flow connection with the lower drum and with the distribution header;
the outlets of the evaporator tubes are at the upper ends of the tubes and further comprising at least one riser in fluid flow connection with the outlets of the evaporator tubes and with the upper drum;
the evaporator inlet line opens into the lower drum, and the evaporator drain line opens into the lower region of the lower drum; and
the lower drum having a steam outlet, the upper drum having a steam inlet, and a steam vent conduit in fluid flow connection with the lower drum steam outlet and the upper drum steam inlet.

14. The heat recovery steam generator of claim 13, further comprising the upper drum and lower drum each having walls, the said walls being about four inches to five inches thick.

15. The heat recovery steam generator of claim 1 wherein the superheater is a high pressure superheater, the evaporator is a high pressure evaporator, and the economizer is a high pressure economizer.

16. A process for converting water into saturated steam in a heat recovery steam generator:
said heat recovery steam generator comprising:
a housing having an inlet into which a hot gas is directed and an outlet through which the gas is discharged, configured to form an internal exhaust gas flow path within the housing so that the exhaust gas can flow through the housing from its inlet to its outlet;
an economizer located within the housing such that the exhaust gas flows through it, the economizer being connected to a source of feedwater for elevating the temperature of the feedwater;
an evaporator for converting water, which is primarily in the liquid phase, into saturated steam, said evaporator comprising: an upper drum oriented horizontally positioned to be external to the housing's internal exhaust gas flow path and; at least one lower drum positioned to be external to the housing's internal exhaust gas flow path and oriented horizontally and located at an elevation less than the upper drum; a drain line connecting the lower region of the upper drum to the lower drum; an inlet line opening into one of the drums; an outlet line leading out of the upper region of the upper drum; a coil having tubes located in a flow of a hot gas and provided with inlets and outlets, with the inlets of the tubes being in communication with the lower drum and the outlets of the tubes being in communication with the upper drum; the evaporator having its coil located in the housing upstream, in the flow of exhaust gas, from the economizer, with the inlet line of the evaporator being connected to the economizer to receive from the economizer water that has undergone heating in the economizer; and
a superheater located within the housing upstream, in the flow of the exhaust gas, from the evaporator, with the outlet line of the evaporator being connected to the superheater; and
the method comprising the steps of:
introducing a flow of water from the economizer into one of two horizontal steam drums, so that the lower drum contains water that is in the liquid phase; directing water from the lower steam drum into the said evaporator coil, and heating water in the evaporator coil sufficiently to transform the water into saturated water and saturated steam;
directing saturated water and steam from the evaporator coil into the upper steam drum;
directing saturated water in the upper steam drum into the lower steam drum; and withdrawing the saturated steam from the upper steam drum.

17. The process according to claim 16 wherein in the step of withdrawing the saturated steam from the upper steam drum the saturated steam flows from the upper steam drum into the superheater.

18. The process according to claim 16 wherein the steam drums are cylindrical and have longitudinal axes that are horizontal.

19. The process according to claim 18 wherein the steam drums are cylindrical.

20. The process of claim 16 wherein the lower drum has a steam outlet, and the upper drum has a steam inlet, further comprising the step of steam flowing from the lower drum steam outlet into the upper drum steam inlet.

21. The process of claim 20 wherein in the step of steam flowing from the lower drum steam outlet into the upper drum steam inlet, the steam flows out of the top of the lower steam drum and flows into the upper region side of the upper drum.

* * * * *